United States Patent [19]

Tomikawa et al.

[11] Patent Number: 4,840,258
[45] Date of Patent: Jun. 20, 1989

[54] BRIEF CASE WITH A PORTABLE WIRELESS TELEPHONE

[75] Inventors: Arifumi Tomikawa; Nihiko Yasukawa, both of Norcross, Ga.

[73] Assignee: Oki Electric Industry Co., Ltd., Tokyo, Japan

[21] Appl. No.: 245,393

[22] Filed: Jul. 15, 1988

Related U.S. Application Data

[62] Division of Ser. No. 071,966, Jul. 10, 1987, Pat. No. 4,790,417.

[51] Int. Cl.⁴ .............................................. A45G 15/00
[52] U.S. Cl. ...................................... 190/102; 190/111
[58] Field of Search ................ 190/102, 1, 119, 11, 190/111, 112; D3/74

[56] References Cited

U.S. PATENT DOCUMENTS

| | | | |
|---|---|---|---|
| D. 135,357 | 3/1943 | Botham | 190/111 X |
| D. 271,725 | 12/1983 | Sherer | D3/74 |
| 1,643,397 | 9/1927 | Walinsky | 190/111 |
| 1,941,375 | 12/1933 | Wildman | 190/1 X |
| 2,180,191 | 11/1939 | Bauch | 190/112 X |
| 2,213,821 | 9/1940 | McCurdy | 190/111 |
| 2,398,299 | 4/1946 | Frandsen | 190/111 X |
| 2,399,787 | 5/1946 | Clerc | 190/1 X |
| 2,705,063 | 3/1955 | Torrent | 190/111 |
| 2,950,003 | 8/1960 | Simmons et al. | 206/566 X |
| 3,104,289 | 9/1963 | Segel | 190/102 X |
| 3,443,671 | 5/1969 | Dyke | |
| 3,454,068 | 7/1969 | Goldstein et al. | |
| 4,020,930 | 5/1977 | Weber | |
| 4,067,422 | 1/1978 | Eberle | |
| 4,255,872 | 3/1981 | Williams, Sr. | |
| 4,257,463 | 3/1981 | Monaco | |
| 4,265,286 | 5/1981 | Rapoport | |
| 4,483,427 | 11/1984 | Gerch | |
| 4,643,281 | 2/1987 | Erickson | 190/119 |
| 4,694,940 | 9/1987 | Horiuchi | 190/119 X |

FOREIGN PATENT DOCUMENTS

| | | | |
|---|---|---|---|
| 553428 | 6/1932 | Fed. Rep. of Germany | 190/111 |
| 840997 | 1/1939 | France | 190/111 |
| 1085191 | 1/1955 | France | 190/111 |
| 2480579 | 10/1981 | France | 190/111 |
| 355488 | 8/1931 | United Kingdom | 190/111 |
| 415773 | 9/1934 | United Kingdom | 190/111 |
| 585845 | 2/1947 | United Kingdom | 190/111 |

*Primary Examiner*—William Price
*Attorney, Agent, or Firm*—Spencer & Frank

[57] ABSTRACT

A brief case for containing a portable wireless telephone set and other items, comprises a base having a first space for accommodating the telephone set and a second space for accommodating the other items, and a lid assembly capable of being partially opened to permit access to and of the telephone set while preventing display of the other items.

3 Claims, 7 Drawing Sheets

BRIEF CASE WITH A PORTABLE WIRELESS TELEPHONE

This is a division of application Ser. No. 07/071,966 filed July 10th, 1987 now U.S. Pat. No. 4,790,417.

BACKGROUND OF THE INVENTION

The present invention relates to a brief case containing a portable wireless telephone, particularly a portable mobile telephone.

FIG. 1 and FIG. 2 show a prior art brief case containing a portable mobile telephone. As shown in FIG. 1, the brief case main unit 1 includes a base 2 and a lid 3 which are pivotally connectd with each other by hinges 4. The base 2 and lid 3 are rigid. The user of the brief case can lock the latches 11a, 11b by use of locks 11c, 11d, and carries the brief case with a handle 12 for transport.

The space inside the base 2 includes a space 5 for accommodating papers, a space for accommodating a battery 9, and a space 6 for accommodating a mobile telephone 7.

A flexible antenna 10 is disposed to extend along an edge of the lid 3 and is connected to the telephone set 7. Because of its flexibility, the antenna 10 is not broken when the brief case is opened and closed and the antenna 10 is accordingly bent.

When the telephone set is used for communication, the lid 3 is opened, a power switch 8 is made closed, the handset of the telephone set 7 is lifted and the keys are pressed for dialing. The telephone set can also be used for receiving a call.

A problem associated with the above structure is that the papers contained in the space 5 are exposed to the eyes of others, if the telephone set must be used in front of others. When the papers require secrecy, the problem is acute. As a result, the telephone set cannot be used in front of others, or the secret papers cannot be contained in the brief case.

SUMMARY OF THE INVENTION

An object of the invention is to provide a brief case which allows the telephone set or the handset alone to be taken out without opening the entire lid.

Another object of the invention is to provide a brief case which allows a telephone set and papers to be taken out independently of each other.

According to the invention, the base of the brief case is divided or partitioned into a space for the telephone set and a space for papers, and separate lids are provided for the respective spaces. The lids may be so formed that the combination of the lids makes up a lid for the entire base. Alternatively, one of the lids may be formed to cover the entire base while the other lid is formed in part of the first one of the lids.

DESCRIPTION OF THE PREFERRED EMBODIMENTS

Figure 1:
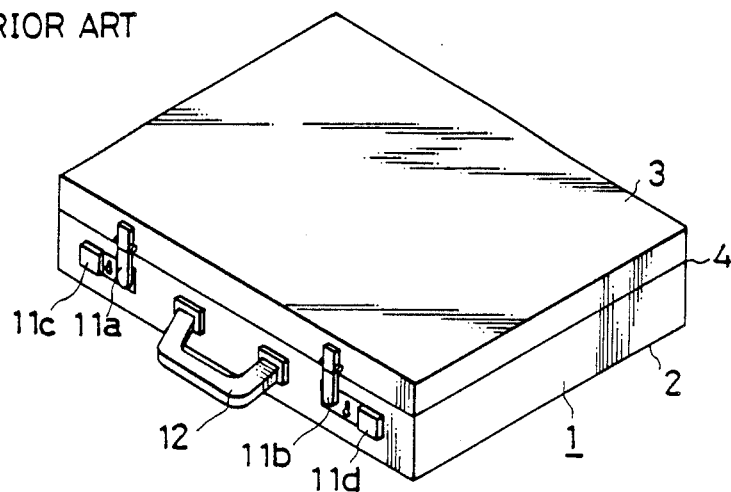
FIG. 1 is a perspective view showing a conventional brief case with its lid closed.
Figure 2:
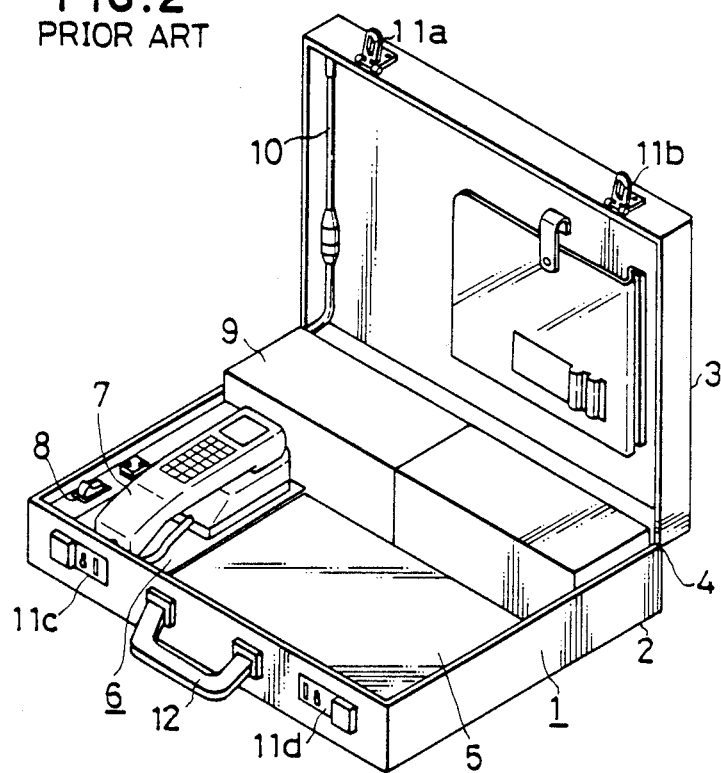
FIG. 2 is a perspective view of the brief case of FIG. 1, with its lid open to show a telephone set contained in the base.

A first embodiment of the invention will now be described with reference to FIGS. 3 and 4. The brief case of this embodiment is generally identical to the prior art brief case shown in and described with reference to FIGS. 1 and 2. However, the lid consists of a first part 13a constituting the lid for the telephone set 7 and a second part 13b constituting the lid for the papers. In this connection, it should be noted that the boundary between the space 6 for the telephone set and the space 5 for the papers extends parallel with the sides 2a (only one of them being shown) of the base 2 and at right angles with the axis of the hinge couplings 4. A partition 14 is provided along this boundary. The edges 13c, 13d abutting with each other when the lid parts 13a, 13b are in alignment with each other extend at right angles with the axis of the hinge couplings 4, and in alignment with the partition 14. As illustrated, the edges of the lid parts 13a, 13b do not overlap each other in the direction orthogonal to the direction of the edges 13c, 13d.

Moreover, the hinge couplings 4 are provided for each of the lid parts 13a, 13b. As a result, each of the lid parts 13a, 13b can be opened and closed independently of each other.

When the telephone set is to be used, the lock 11c is manipulated to release the latch 11a on the lid part 13a and the lid part 13a is opened. The antenna 10 is extended and the power switch 8 is turned on. The handset 7a can then be lifted and the keypads manipulated to input the number of the subscriber to which the communication is to be made. The telephone set can also be used for receiving a call.

During the use of the telephone set, the lid part 13b can be kept closed, so that the papers in the space 5 are not exposed to the eyes of others who might be present.

Use of the partition 14 is advantageous in that the papers in the space 5 will not move into the space 6 even when the brief case is tilted.

Figure 3:
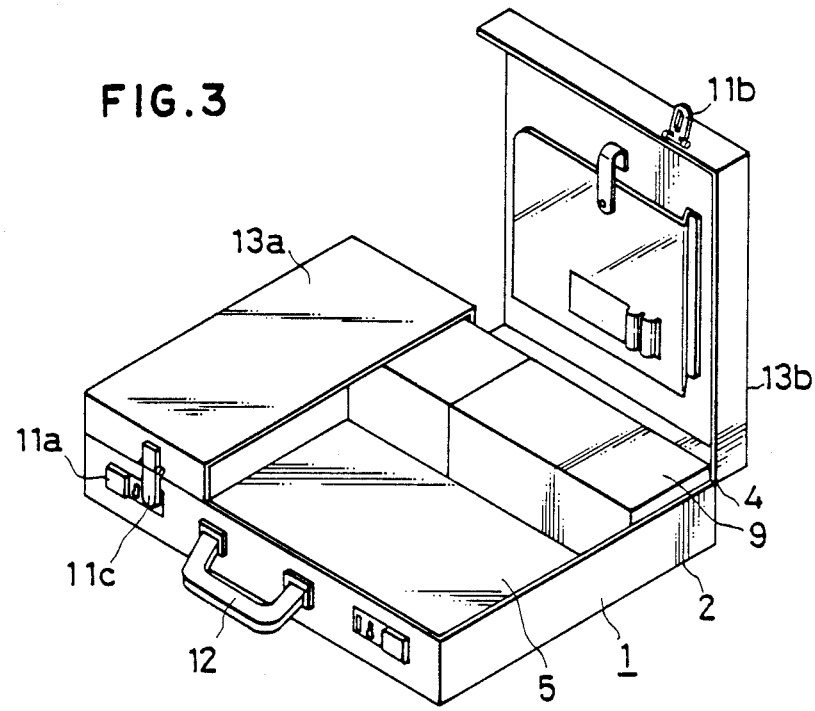
FIG. 3 is a perspective view showing a first embodiment of the invention with the lid for the papers being open.
Figure 4:
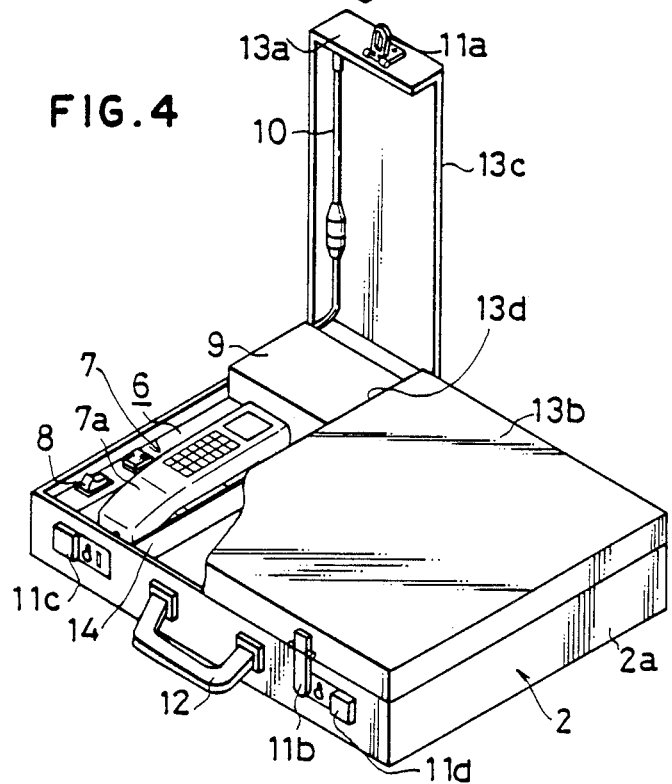
FIG. 4 is a perspective view showing the first embodiment of the invention with the lid for the telephone set being open.
Figure 5:
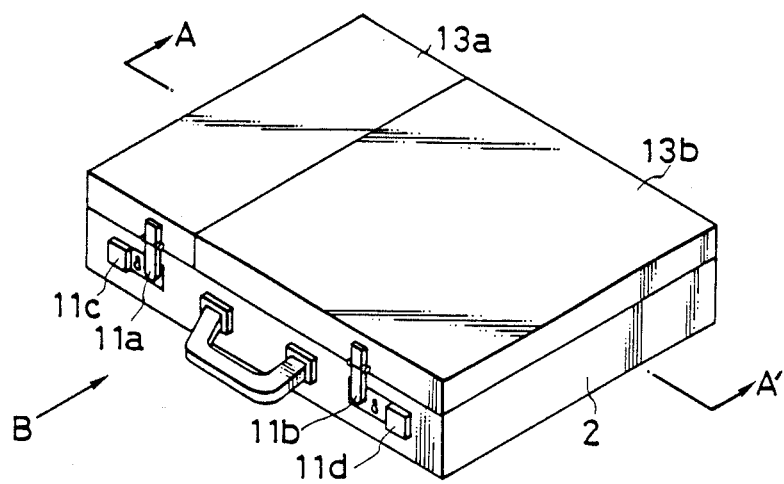
FIG. 5 is a perspective view showing a second embodiment of the invention, which is an improvement over the first embodiment.
Figure 6:
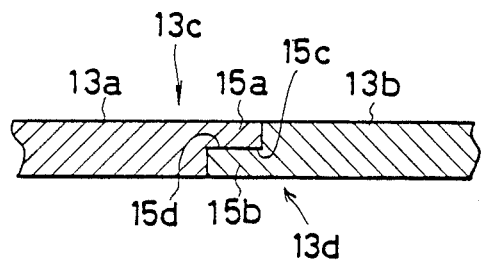
FIG. 6 is a cross sectional view along line A—A' in FIG. 5.

A modification to the embodiment of FIGS. 3 and 4 is shown in FIGS. 5 and 6. As is best seen from FIG. 6 which shows a cross section along line A—A' in FIG. 5, the edges 13c, 13d of the lid parts 13a, 13b are so formed to have protrusions 15a, 15b which overlap with each other and in abutment with each other at the lower and the upper surfaces 15c and 15d, respectively. This arrangement gives better sealing along the edges 13c, 13d of the lid parts 13a, 13b.

Since the protrusion 15a is positioned above the protrusion 15b, the lid part 13a can be opened while the lid part 13b is closed. This arrangement is advantageous in many cases where it is desired to use the telephone set without displaying the papers.

To open the lid 13b, the lid 13a must also be opened. When the lock 11d is not locked (by inadvertence for example), the lid 13b cannot open if the lock 11c for the lid 13a is locked. Accordingly, undesired falling-out of the papers when the brief case is being carried can be prevented.

Figure 7:
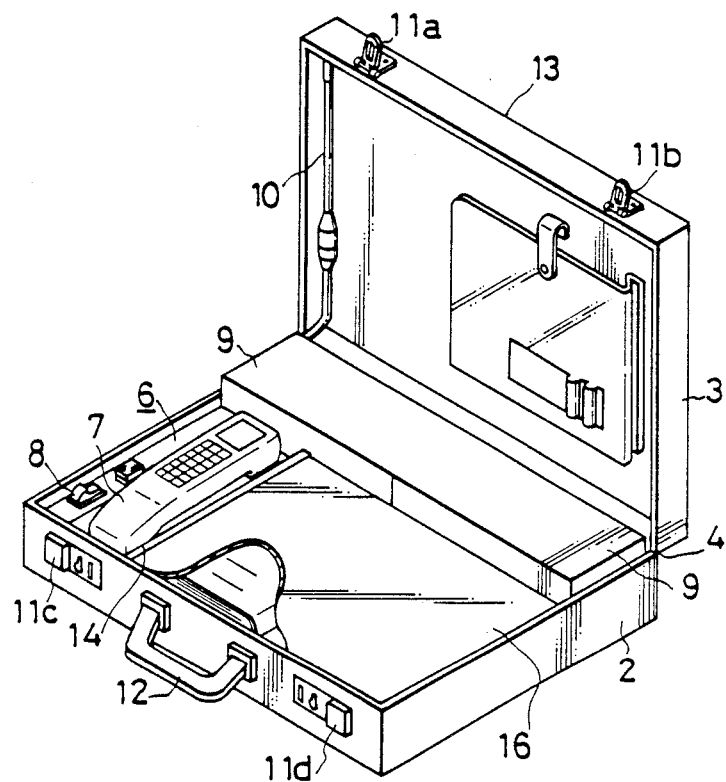
FIG. 7 is a perspective view, partially broken away, showing a third embodiment of the invention with the lid 13 being open.
Figure 8:
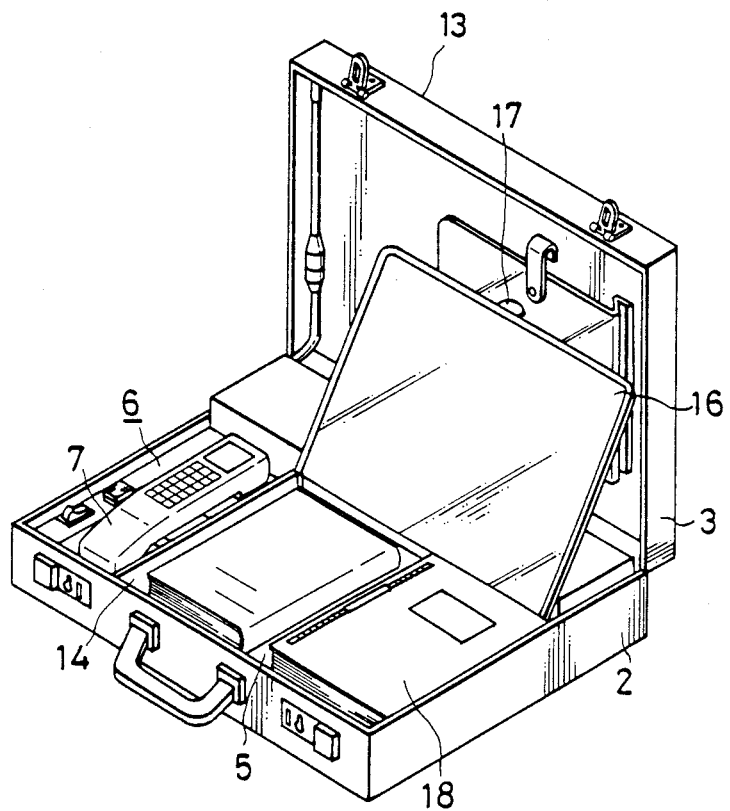
FIG. 8 is a perspective view of the embodiment of FIG. 7, with the lid 16 being open.

Another embodiment of the invention is shown in FIGS. 7 and 8. In this embodiment, an inner lid 16 is provided to cover the space 5 for the papers 18. The inner lid 16 is hinge-coupled with the base 2. The outer lid 13 is integral as in the prior art.

When it is desired to use the telephone set, the outer lid 13 is opened. The paper 18 can be kept covered by the inner lid 16. To take out the paper 18, a tag 17 can be pinched with the fingers and lifted to open the inner lid 16.

In the embodiment of FIGS. 7 and 8, the outer lid 13 need not be divided, so that better sealing and a greater mechanical strength can be obtained.

Figure 9:
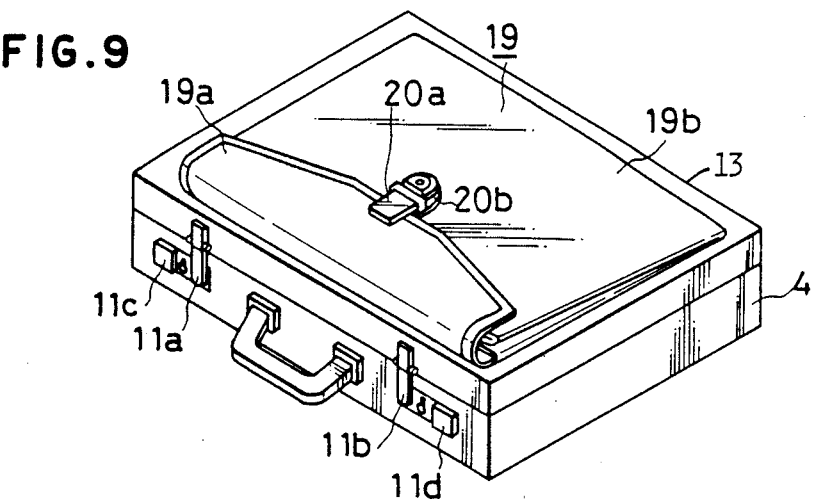
FIG. 9 is a perspective view showing a fourth embodiment having soft cases 19a, 19b, with the lid 13 being closed.
Figure 10:
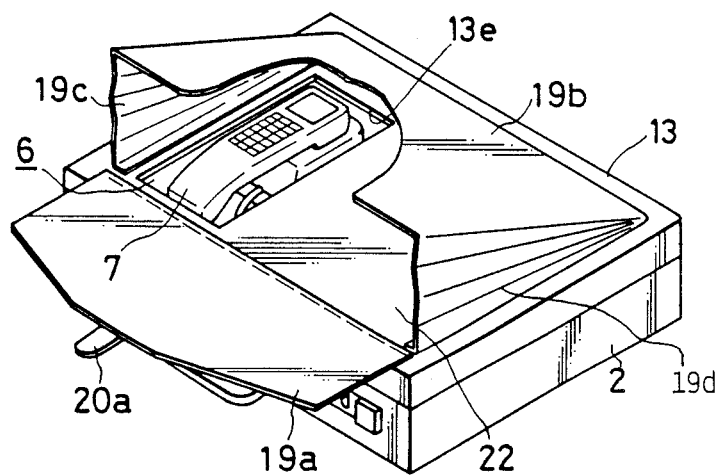
FIG. 10 is a perspective view of the fourth embodiment with the soft cases 19a, 19b being open to enable the telephone set 7 to be taken out.
Figure 11:
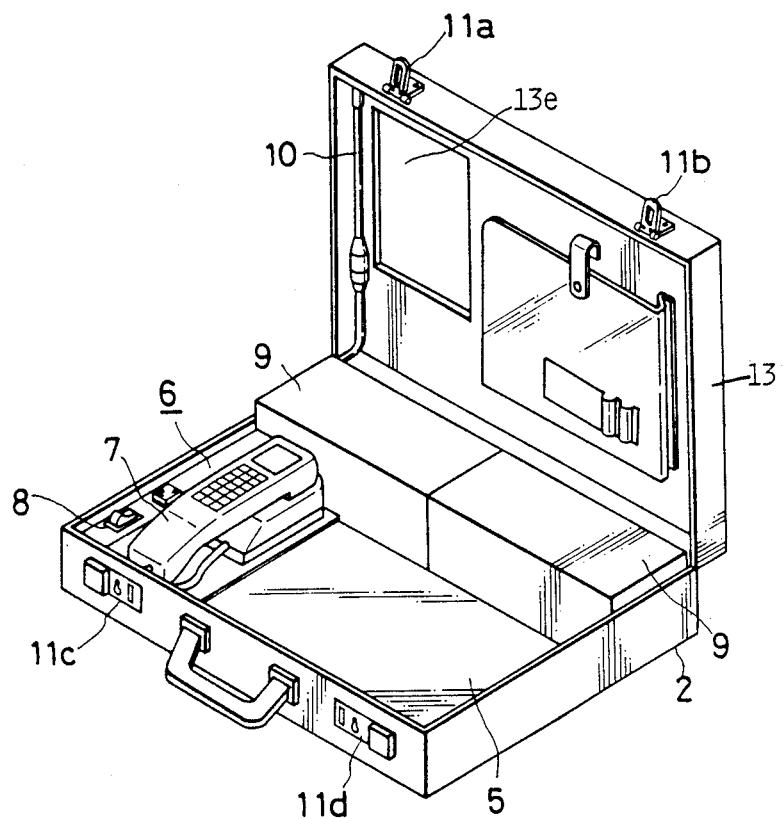
FIG. 11 is a view showing the fourth embodiment with the lid 3 being opened.

A further embodiment of the invention is shown in FIGS. 9, 10 and 11. In this embodiment, an opening 13e is provided in the integral outer lid 13, over the handset of the telephone set. A soft cover or case 19 including a flap 19a, a front panel 19b, bellow-sides 19c, 19d and a catch assembly 20a, 20b are provided to cover the almost entire surface of the outer lid 13, including the opening 13e. The soft cover 19 can be made mainly of leather. When the flap 19a is closed, the telephone set is unseen. To use the telephone set, the catch assembly 20a, 20b is released and the flap 19a is opened with the bellow-sides 19c, 19d being extended. As a result, the telephone set is accessible through the opening 13e. That is the handset can be lifted off the hook. Because the opening 13e is limited to the part of the lid 13 over the telephone set, the papers in the space 5 remain unseen.

The space 22 inside the soft cover 19 can be used to contain papers which may be displayed during use of the telephone set.

In the embodiment described, the base of the brief case has a space for a telephone set and a space for papers. The invention can be applied to brief cases with a base having a space for a telephone set and a space for any other items such as clothing.

What is claimed is:

1. A brief case for containing a portable wireless telephone set and other items, comprising:
   a base having a first space for accommodating the telephone set and a second space for accommodating said other items, and
   a lid assembly capable of being partially opened to permit access and use of the telephone set, said lid assembly including
   a first lid substantially covering the entire base and having an opening over the space for the telephone set; and
   a second lid covering at least the opening in said first lid.

2. A brief case according to claim 1 wherein said first lid is substantially rigid, and said second lid is a soft cover having its edges bonded to said first lid.

3. A brief case according to claim 2, wherein said soft cover has bellow sides.

* * * * *